(12) United States Patent  
Berens et al.

(10) Patent No.: US 7,079,392 B2  
(45) Date of Patent: Jul. 18, 2006

(54) SLIM-LINE MOUNTING MECHANISM FOR ELECTRONIC PACKAGING

(75) Inventors: Jessica Rose Berens, Rochester, MN (US); Steven Dale Greseth, Rochester, MN (US); William Michael Monson, Rochester, MN (US); Scott Alan Shurson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 10/723,800

(22) Filed: Nov. 26, 2003

(65) Prior Publication Data

US 2005/0111187 A1 May 26, 2005

(51) Int. Cl.
*H05K 7/20* (2006.01)

(52) U.S. Cl. ............... 361/695; 361/694; 361/726; 361/727

(58) Field of Classification Search ............... 361/684, 361/685, 687, 694, 695, 725–727; 165/80.3
See application file for complete search history.

(56) References Cited

U.S. PATENT DOCUMENTS

| | | | | |
|---|---|---|---|---|
| 5,717,571 A | * | 2/1998 | Helot ........................ | 361/685 |
| 5,761,032 A | * | 6/1998 | Jones ........................ | 361/685 |
| 6,025,989 A | * | 2/2000 | Ayd et al. ................. | 361/695 |
| 6,246,580 B1 | * | 6/2001 | Weng ........................ | 361/695 |
| 6,272,008 B1 | * | 8/2001 | Huang ....................... | 361/683 |
| 6,879,490 B1 | * | 4/2005 | Mattei et al. .............. | 361/727 |
| 2002/0043908 A1 | * | 4/2002 | Gan .......................... | 312/223.2 |
| 2003/0099089 A1 | * | 5/2003 | Chen ......................... | 361/685 |
| 2003/0133266 A1 | * | 7/2003 | Behl et al. ................. | 361/695 |
| 2005/0063156 A1 | * | 3/2005 | Olesiewicz et al. ........ | 361/695 |

* cited by examiner

*Primary Examiner*—Lynn Feild
*Assistant Examiner*—Robert J. Hoffberg
(74) *Attorney, Agent, or Firm*—Robert W. Lahtinen

(57) ABSTRACT

A multi function component mounting assembly is shown that, in the environment illustrated, supports a blower in an electronic device chassis in tandem with another component requiring frequent user access such as a media component. The assembly is supported on a sheet metal tray or frame with the blower mounted beneath the distal end of the tray along with its electrical connector which is supported with two degrees of limited motion to accommodate remote auto docking. The tray is secured in the opening by a unitary molded latch element that is permitted limited longitudinal movement with respect to the tray and includes biasing means which engage the tray to bias the assembly into a fully inserted position in the chassis. A drop down handle assists manual insertion and withdrawal of the assembly and disengagement of the latch securing the assembly and is moved to a stored position by insertion of the media component. The space beneath the tray between the blower and the chassis opening through which the mounting assembly is inserted affords the space in which the media component is installed.

5 Claims, 6 Drawing Sheets

SLIM-LINE MOUNTING MECHANISM FOR ELECTRONIC PACKAGING

FIELD OF THE INVENTION

The present invention relates to electronic packaging and more particularly to an assembly that provides for the mounting of two component assemblies in tandem to afford multiple functions at a single using device access opening.

BACKGROUND OF THE INVENTION

Limited space is a common problem in electronic products that require air moving devices. Highly concentrated, high performance electronics require reliable air flow to assure extended life and reliability. The air circulating devices must be accessible on limited occasions for service or replacement and yet not interfere with other assemblies, such as media devices that must be conveniently located for frequent operator access during device operation. Such air circulating devices must be capable of distributing air flow through interior passages to dissipate heat from the confined, remote portions of the apparatus. To facilitate the inclusion of all required product functions within a minimal space it is desirable to combine as many features and functions as possible within a single assembly.

SUMMARY OF THE INVENTION

The present invention provides a structure for mounting two device components in tandem through a single chassis access opening. The most practical application of the invention is to first insert and remotely position a component which requires minimal user access and to mount in tandem, at the access opening, a component that requires frequent user access. In the example shown and described in the following specification, provision is made for a blower assembly and a media assembly to be mounted in tandem through a single chassis access opening. The blower, which need only be accessed for infrequent service or even more unlikely replacement, is first inserted through the chassis access opening and thereafter the media assembly is received through the same access opening and is secured in tandem with the blower assembly adjacent the chassis opening to facilitate frequent user access.

The illustrated mechanism incorporates the structures for blower mounting, auto docking, a retractable handle, diagnostic feedback, retention and media mounting point into a single assembly that has approximately the same height and width as the blower. The blower is mounted at the end of a sheet metal tray. The tray not only supports the blower, but also includes a mounting point for the blower's floating power connector, diagnostic light pipes, and a multiple function latch and pivoting handle for installing, retaining and removing the tray assembly. The tray also includes a track structure that functions with a cooperating track to permit the tray and mounted blower to be installed into a using system chassis, retained therein and removed therefrom without tools.

With the blower mounted on the tray at the end first inserted into the chassis opening, the blower mounting assembly provides a mounting space at the chassis access opening for a device such as a media drive requiring regular user access. During installation of such a device, the handle is pivoted to a remote, stored position as the media device is being inserted. Further, a media mounting point is provided by the tray.

In use, the blower mounting assembly slides into the using system chassis and is aligned by the cooperating track structures to position the blower, dock the blower power connector and align the light pipes within the using system as the latch secures the tray and biases the tray into the installed, connected location.

With the blower tray assembly secured in the installed, connected position within the using system chassis, a media device can be mounted in tandem with the blower through and accessible at the same using system chassis opening through which the blower assembly was inserted. As the media device is inserted, the tray drop down handle is pivoted to a remote, stored location and the fully inserted media device is secured at the tray mounting point, also without the use of tools. Thus the blower and media device are mounted in tandem at the same using device chassis opening. The light pipes carried by the tray enable condition and control signals to be observed at the device exterior.

When the media is removed, the pivoting, drop down handle drops to a visible position at which it can be used to release the latch and withdraw the tray, and the blower mounted thereon, from the chassis.

DETAILED DESCRIPTION

Figure 1:
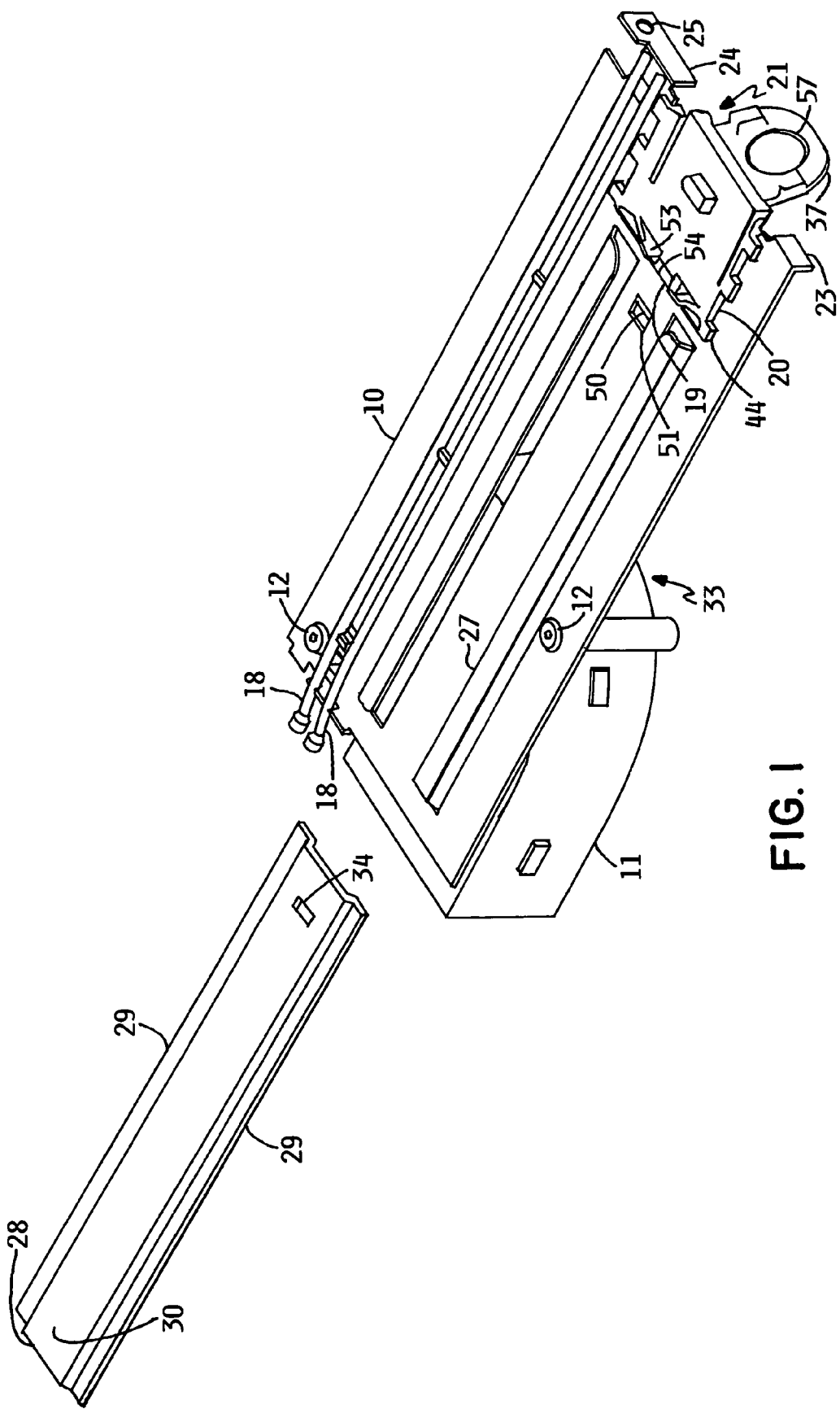
FIG. 1 shows the blower mounting assembly of the present invention and the support member which is attached to the upper wall surface of the enclosure compartment in which the assembly is received and which aligns and supports the assembly.
Figure 2:
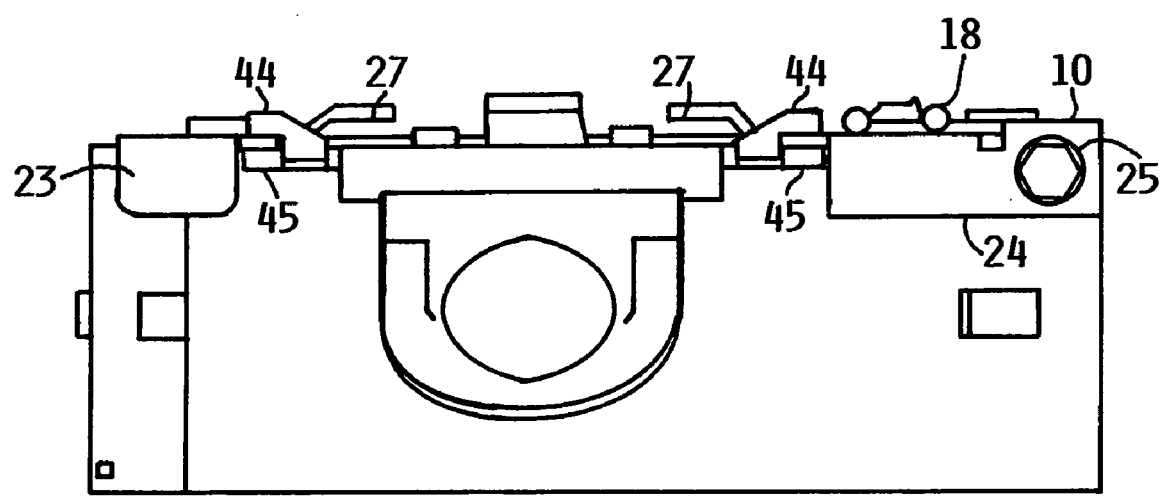
FIG. 2 is a front view of the blower mounting assembly of FIG. 1 with the handle pivoted down.
Figure 3:
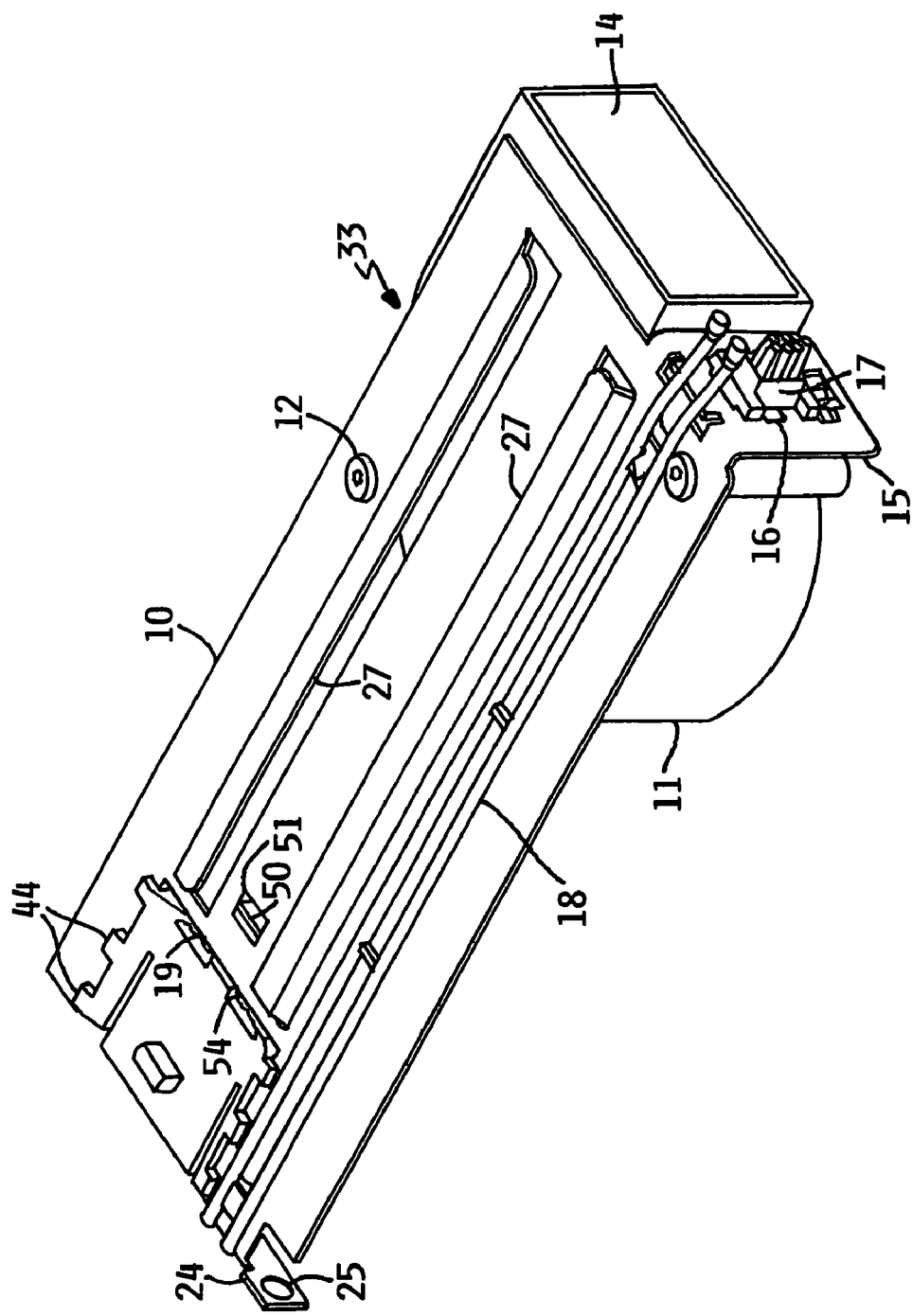
FIG. 3 illustrates the blower mounting assembly of FIG. 1 showing the rear surface including the blower discharge outlet and floating electrical connector.

The blower mounting assembly of the present invention is illustrated in FIGS. 1 through 3. FIG. 1 shows the sheet metal tray 10, which serves as a frame for the blower mounting assembly, with the blower 11 secured thereto by a pair of bolts 12. The blower 11 has the discharge outlet 14 at the rear of the tray 10 with the height and width of the blower mounting assembly being substantially identical to the height and width dimensions of the blower. The downwardly depending flange 15, formed as a part of the sheet metal tray 10, has an opening 16 at which a connector 17 is mounted that connects the blower to the power supply. The connector 17 is mounted to allow limited motion in the plane of flange 15 which enables blind auto-docking with a socket mounted at the rear wall of a using system cavity into which the blower mounting assembly is inserted. Also forming a part of the tray assembly are a pair of light pipes 18 that are secured to the upper surface of tray 10 and enable visual feedback of a condition at the concealed rear of the assembly to the front of the assembly at the chassis opening.

The front end of the tray includes a central cut out portion 19 defined by parallel sides 20 extending rearwardly from the tray front, in which a latch and handle assembly 21 is received. At each side of the cut out are turned flanges, 23 and 24 respectively, formed as a part of the sheet metal tray one of which includes an aperture 25 that serves as a media mounting point. Raised parallel flange portions 27 are formed in the tray 10 and extend toward one another. Flanges 27 are supported on and move longitudinally with respect to flanges 29 presented by the support member 28 to align and support the blower mounting tray assembly 33 in the installed position and during insertion and withdrawal of the tray assembly into and out of a using system enclosure. The support member 28 has a central planar portion 30 with marginal flange portion 29 outwardly extending and downwardly offset therefrom. The support member 28 is secured to the upper wall surface of a chassis cavity in which the blower mounting assembly is received. Attachment of support member 28 is preferably effected by spot welding so that the mounting is achieved without the addition of any projecting structure beyond the surface of support member central planar portion 30. The support member 28 also includes a latch opening 34.

Figure 4:
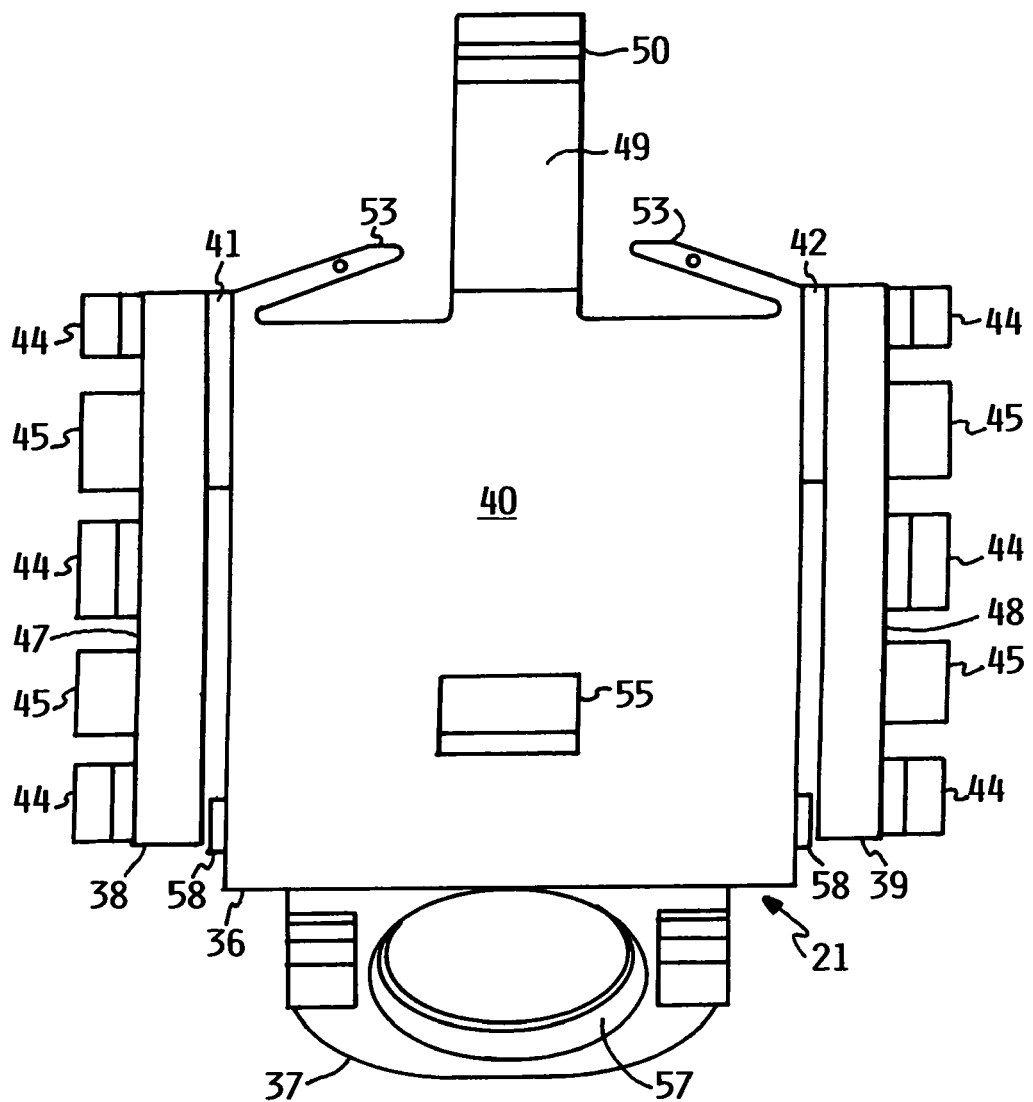
FIG. 4 is a detailed plan view of the latch and drop down handle shown in FIGS. 1 through 3.
Figure 5:
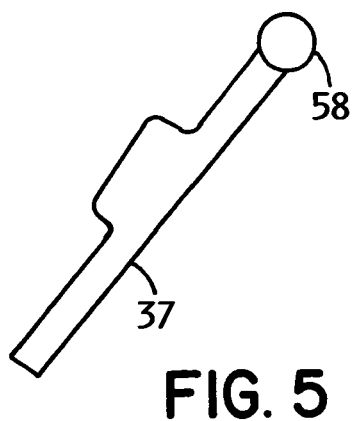
FIG. 5 is a side elevation of the drop down handle of FIG. 4.

The latch and handle member 21 appears in FIGS. 1 though 3 and is also shown in greater detail in FIGS. 4 and 5. The latch and handle assembly includes a latch portion 36 and a pivotable handle 37. The latch 36 includes outrigger portions 38 and 39 which are respectively secured to a central portion 40 by webs 41 and 42. The outriggers 38 and 39 include upper projections 44 and lower projections 45. With the latch 36 positioned at the tray central cut out 19, the cut out edgers 20 are adjacent to the outrigger side surfaces 47 and 48 with upper projections above the tray and lower projections 45 below the tray. The latch is thus confined in the vertical and lateral directions while permitted longitudinal motion with respect to the tray 10. The latch rear projection 49 terminates in a vertical latch projection 50 which in the assembled condition is secured in the tray latch opening 51 to resist withdrawal of the latch 36 longitudinally from tray 10. The latch opening 51 extends longitudinally rearward from the position at which the latch projection 50 is captured. Formed integrally with the latch are a pair of resilient biasing elements 53 which engage the rear edge 54 of the tray cutout. This allows the latch 36 to move rearward relative to tray 10 against the force exerted by the biasing elements 53. Such relative motion is accommodated by movement of the latch projection 50 within the elongated tray latch opening 51 and the degree of freedom provided by the upper and lower projections 44 and 45 extending over the side edges of the tray central cutout.

The latch 36 also has a latch projection 55 which extends into the support member opening 34 when the tray is fully inserted with tray flanges 27 overlying the support member marginal flanges 29. The latch 36 also supports a drop down handle 37. Handle 37 includes a loop portion 57 that a user may grasp and sidewardly extending trunions 58 which are received in cylindrical openings in latch 36. The handle 37 is pivotable between the drop down position shown and a stowed position where it is pivoted upwardly against the lower surface of latch 36. The handle 37 may be used to flex the latch downward to disengage the latch projection 55 from the support member opening 34 and withdraw the blower mounting assembly from an installed position.

In operation, when the blower mounting assembly is fully inserted with the tray flanges 27 overlying the marginal flange portions 29 of the support member 28, the latch projection 55 is received in the support member opening 34 after the biasing elements 53 have engaged the tray cut out edge 54. This assures that the tray 10 and the blower structure mounted thereon is biased into full engagement to position the blower and assure positive engagement of the auto docking electrical connector.

The blower 11 occupies less than half the space defined by the height and width of the blower and the length of tray 10. Further, the blower occupies the space most remote from the access opening through which the blower mounting assembly is inserted. The volume adjacent the access opening provides a location for a media device or other apparatus requiring user access. Use of this space is further facilitated by the media mounting point 25 provided by the tray turned flange 24.

Figure 6:
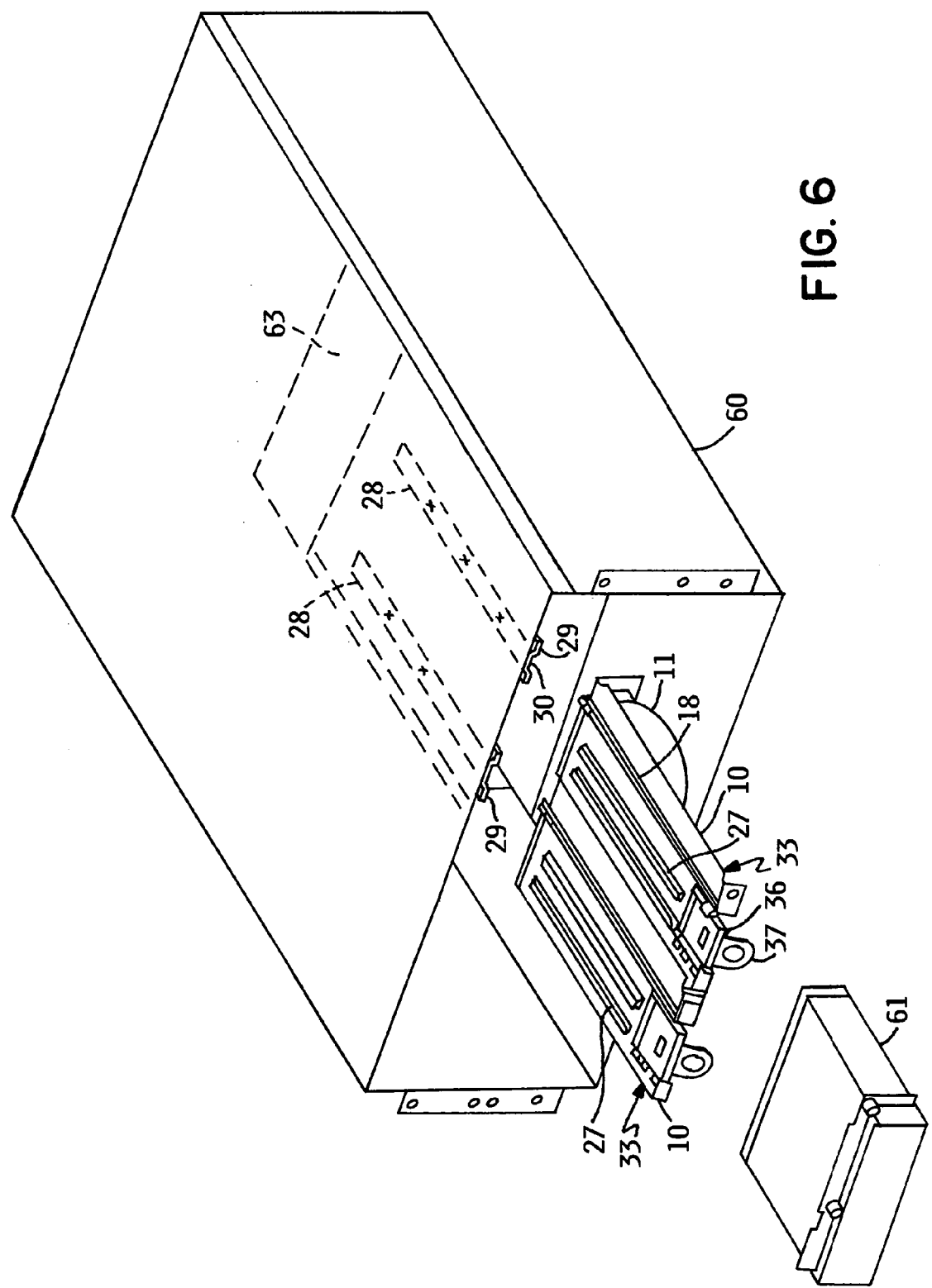
FIG. 6 is a simplified drawing showing a using device chassis compartment with a pair of blower mounting assemblies and a media device aligned for insertion into the chassis compartment.
Figure 7:
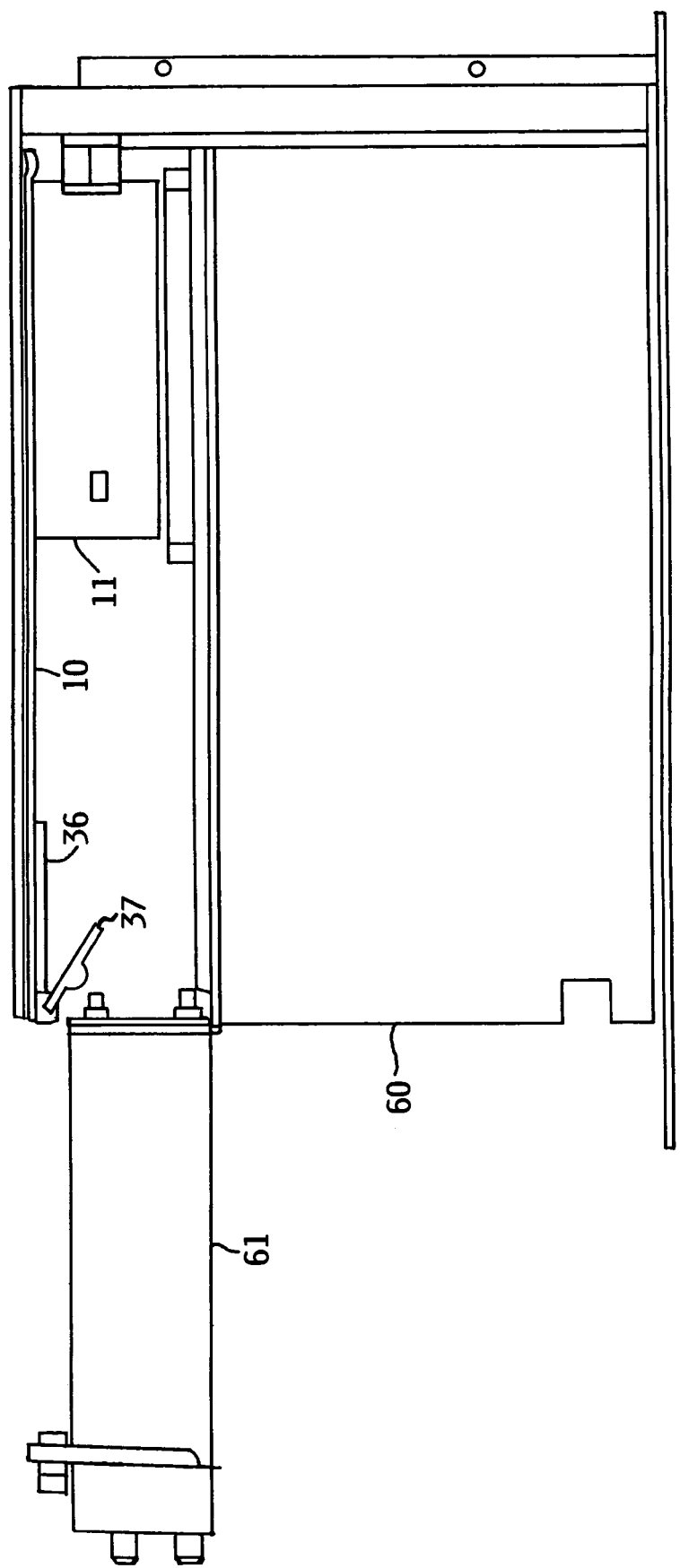
FIG. 7 shows a portion of the chassis of FIG. 6, partially broken away, with the blower mounting assemblies installed and the media device displacing the drop down handle as it is inserted in tandem with the blower.

FIGS. 6 and 7 are simplified showings of the blower mounting assembly 33 of the invention in conjunction with a using system chassis 60 and a media device 61 that is to be assembled in tandem with the blower. FIG. 6 shows a pair of blower mounting assemblies 33 as described above, aligned for installation into a portion of a using system chassis 60 to enable the blowers to aspirate a flow of air in a central passageway 63 of the using system enclosure. A media unit 61 is aligned for insertion in tandem with the blowers within the blower mounting assemblies 33 adjacent the entrance to the chassis 60. The blower assemblies are supported, aligned and guided into the installed location by the raised flange portions that slide on the downwardly displaced flanges of the support members 28. The support members 28 may be secured to the upper wall surface of the compartment of chassis 60 into which the assembly 33 is installed by almost any attachment technique, such as bolting, riveting, bonding, staking or welding. However, to facilitate assembly of the mounting assembly 33 into a minimum space within the chassis 60, it is recommended that a minimally intrusive attachment mode be used, such as staking or spot welding.

As viewed in FIG. 7, with the blower assemblies 33 installed and latched into position within the chassis chamber, the media 61 is inserted, in tandem with the blowers 11 in the space adjacent the chassis exterior. The space within the blower assembly, beneath tray 10 and forward of blower 11, may define a standard media form factor (a space with the industry standard length, height and width dimensions). In the alternative, the blower assembly could define a portion of the form factor, as shown in FIGS. 6 and 7 wherein a standard device occupies the space defined by a pair of side by side blower mounting assemblies or a single blower assembly could define the space occupied by multiple devices. As the media is inserted the drop down handle 37 is abutted by the media housing portion entering the chamber cavity and pivoted to a stored position against the lower surface of the latch 36. With the media fully inserted, it is secured in the using system by being secured at the blower assembly mounting points 25. Further, with the blower assembly 33 fully inserted into the chassis 60 and the media device 61 installed in tandem with the blower 11, the light pipes 18 provide a visual feedback of a remote signal light disposed in a concealed location within the chassis.

The blower mounting assembly 33 is aligned with the chassis opening, inserted into the chassis 60 and secured in the installed position by the latch assembly 21 without the use of tools. Likewise, the mounting assembly 33 can be removed, the media device 61 can be installed in tandem with the blower 11 and removed, all without the use of tools.

The foregoing description of an embodiment of the invention has been presented for purposes of illustration and description. It is not intended to be exhaustive or limit the invention to the precise form disclosed. Many modifications and variations are possible in light of the above teaching. It is intended that the scope of the invention be limited not by the description and illustrations, but rather by the claims appended hereto.

What is claimed is:

1. A blower mounting mechanism for mounting a blower on and within a device chassis comprising
   a frame member;
   a blower attached to said frame member adjacent one end of said frame member;
   a first track portion carried by said frame member;
   a second track portion presented by said device chassis which engages and cooperates with said first track portion to permit relative linear motion of said frame member into and out of said chassis through a chassis opening and to provide support of said frame member on said device chassis;
   a latch element, which is a single molded member comprising a central portion that includes a latch projection formed as an integral part thereof and a pair of longitudinally extending outrigger portions respectively connected at each lateral side of said central portion by a reduced cross section web portion with each said outrigger portion including a plurality of outwardly extending projections;
   said frame member including a central cut out portion presenting confronting edge surfaces which are confined respectively between said latch element outrigger portion projections, enabling said latch element to be supported on and longitudinally movable relative to said frame member at the end of said frame member opposite said one end;
   said latch member latch projection being engageable with a cooperating latch means comprising an opening in said device chassis into which said projection is received to retain said frame member within said device chassis when said frame is fully inserted into said device chassis with said frame member one end first entering said device chassis opening;
   means for manually releasing said latch projection from said chassis opening;
   biasing means carried by said latch element for engaging said frame member when said latch means is engaged with said cooperating latch means to bias said frame toward said fully inserted position within said chassis; and
   a drop down handle pivotably mounted on said latch element central portion and pivotable between an operative position at which it can be used to disengage said latch projection from said device chassis opening and a stored position closely adjacent said latch element.

2. A component mounting mechanism for mounting a component within a device chassis through a device chassis opening comprising:
   a sheet metal tray member;
   a first component secured to the lower surface of said tray member adjacent one end thereof;
   a cut out portion of said tray member extending from the end opposite said one end that presents parallel longitudinal edge surfaces;
   a latch element formed as a single integral molded member and supported on said tray member at said cut out portion for limited longitudinal movement with respect to said tray;
   a latch projection carried by said latch element;
   said latch element further including biasing means formed as a part of said latch element for engaging said tray member when said tray member is fully inserted through said device chassis opening to bias said tray member toward said fully inserted position;
   said latch element further comprising a central portion and a pair of outrigger portions positioned respectively at each lateral side of said latch element central portion with each secured to said central portion by a reduced cross section web and each presenting upper and lower outwardly extending projections that capture the respective said tray member longitudinal edge surface therebetween; and
   a drop down handle pivotably mounted on said latch element central portion and pivotable between a normal, operative, depending position whereat it can be grasped to manually manipulate said latch member and a stored position closely adjacent said latch element central portion.

3. The component mounting mechanism for mounting a component within a device chassis of claim 2 wherein said first component is a blower and said second component is a media device.

4. A component mounting mechanism for mounting components in tandem within a device chassis comprising:
   a frame member;
   a first component attached to said frame member adjacent one end of said frame member;
   a first track portion carried by said frame member;
   a second track portion mounted on said device chassis which engages and cooperates with said first track portion to permit relative linear motion of said frame member into and out of said device chassis through an opening in said device chassis and to provide support for said frame member on said device chassis;
   a latch element carried by said frame;
   cooperating latch means carried by said device chassis and engageable by said latch element to secure said frame member at the fully inserted position within said deice chassis; and
   a drop down handle pivotally mounted on said latch element and operable to disengage said latch element from, said cooperating latch means, whereby said frame may be removed from said device chassis; said drop down handle being pivotable between an operative position at which it can be used to disengage said latch element form said cooperating latch means and a stowed position closely adjacent said latch element.

5. The component mounting mechanism for mounting components in tandem within a device chassis of claim 4 further comprising:
   a second component removably mounted on said frame member at the end opposite said one end;
   said second component being engageable with said drop down handle to move said drop down handle from said operative position to said stored position as said second component is mounted on said frame member.

* * * * *